United States Patent [19]

Bruch

[11] Patent Number: 4,905,912
[45] Date of Patent: Mar. 6, 1990

[54] SIDE MOUNTED OR PULL TYPE PARTICULATE MATERIAL SPREADER

[76] Inventor: Leo Bruch, P.O. Box 68, Templeton, Iowa 51463

[21] Appl. No.: 326,995

[22] Filed: Mar. 22, 1989

[51] Int. Cl.$^4$ ............................................. A01C 17/00
[52] U.S. Cl. ................................... 239/661; 111/11; 172/248; 239/664
[58] Field of Search ...................... 172/248; 111/11.52, 111/12, 84, 13, 66, 67, 130; 47/1.7, 1.5; 239/661, 664, 665, 164, 165, 281; 222/608, 609, 610, 136

[56] References Cited

U.S. PATENT DOCUMENTS

| | | | |
|---|---|---|---|
| 2,723,860 | 11/1955 | Weeks | 111/11 X |
| 2,872,196 | 2/1959 | Gibboney | 239/664 |
| 2,947,450 | 8/1960 | Wilson | 222/136 |
| 3,186,719 | 6/1965 | Sosalla | 239/661 |
| 3,511,318 | 5/1970 | Boetto | 172/248 X |
| 4,083,315 | 4/1978 | Crabbs | 111/10 |
| 4,186,885 | 2/1980 | Christian | 239/661 |
| 4,235,376 | 11/1980 | Cohen et al. | 239/155 |
| 4,447,007 | 5/1984 | Farines | 239/165 |
| 4,464,862 | 8/1984 | Peterson | 47/1.5 |
| 4,727,691 | 3/1988 | Kubacak | 239/165 |

FOREIGN PATENT DOCUMENTS 961675  6/1964  United Kingdom ................ 239/661

Primary Examiner—Richard J. Johnson
Attorney, Agent, or Firm—Zarley McKee, Thomte, Voorhees & Sease

[57] ABSTRACT

A support arm has an inner section connected to the three-point hitch of a tractor and an outer section positioned at the side of the tractor carrying a spreader which can spread ground over which the tractor cannot be driven. The spreader may be raised or lowered to reach ditches, side slopes or terraces. A support arm may be converted into a tongue for pulling the spreader behind the tractor when a cart is provided at the outer end, and a hitch is provided on the inner end for being connected to the draw bar of a tractor.

8 Claims, 3 Drawing Sheets

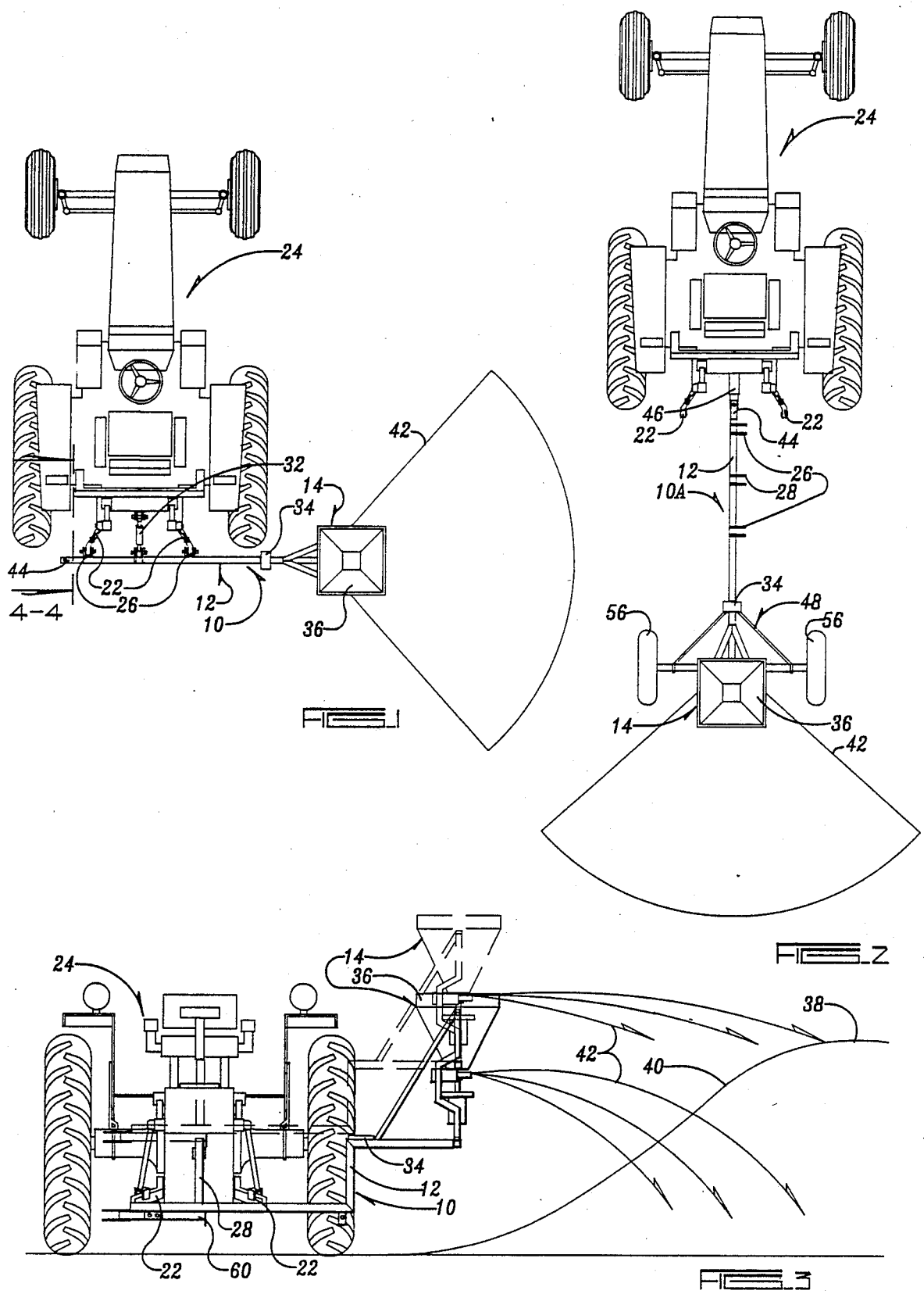

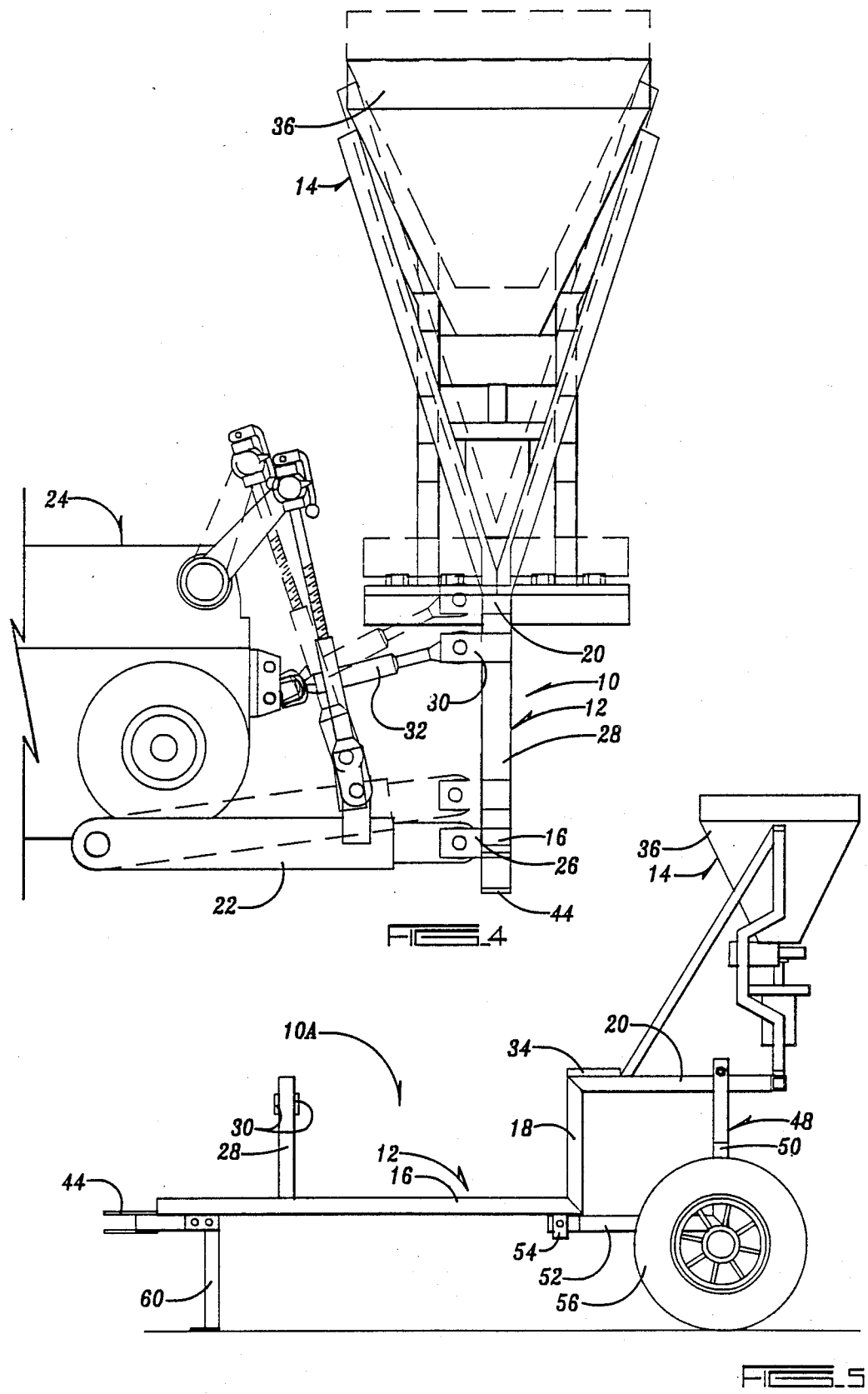

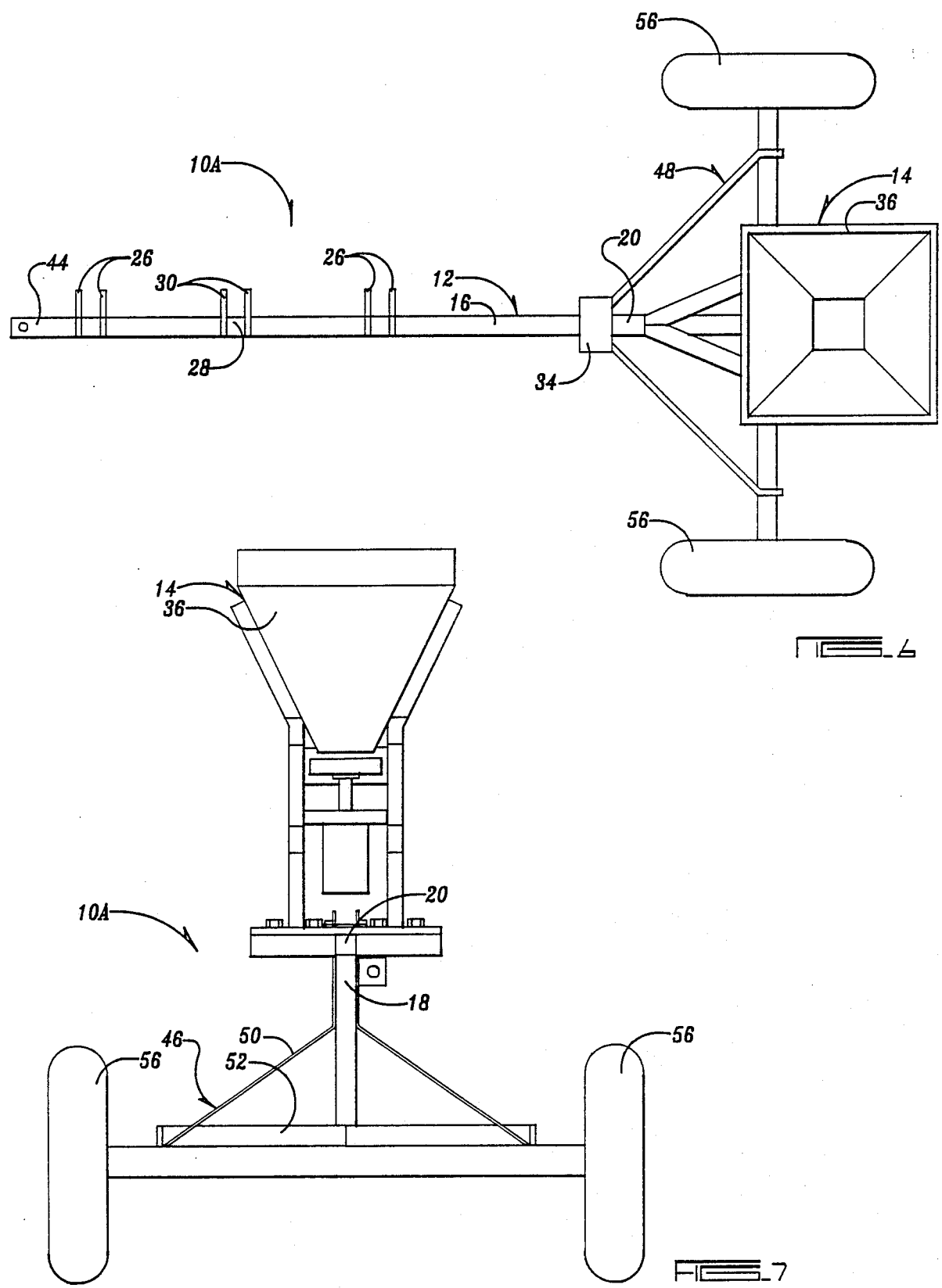

SIDE MOUNTED OR PULL TYPE PARTICULATE MATERIAL SPREADER

BACKGROUND OF THE INVENTION

Conventional seeding equipment may be used when the ground is level and the tractor can be driven over it. A problem arises, however, when it is desired to seed a terrace, the side of a road, fence line or banks along a road. A spreader positioned behind the tractor cannot reach these locations since the tractor cannot drive over the ground to be seeded or fertilized.

Representative prior art patents showing conventional behind the tractor seeders include the U.S. Pat. No. 2,947,450, to Wilson Aug. 2, 1960; 4,235,376, Cohen, Nov. 25, 1980; and 4,083,315, Crabbs Apr. 11, 1978. The spreaders of these patents are unable to spread particulate material to the side of the vehicle to seed the normally inaccessible areas.

SUMMARY OF THE INVENTION

The three point hitch of a tractor is utilized for supporting and raising and lowering a support arm extending to the side of the tractor and outwardly thereof where a spreader is positioned on the outer end of the support arm. Operating the three point hitch the support arm can be raised or lowered thereby positioning the spreader at the necessary heighth for reaching the terraced area or lower side of the road or ditch ground. The spreader may be powered by either a hydraulic or electric motor.

The support arm is convertible into a tongue allowing the spreader to be pulled behind the tractor by connecting the inner end of the support arm to the draw bar of a tractor. A cart is placed under the outer end of the support arm.

DESCRIPTION OF THE DRAWINGS

FIG. 1 is a top plan view of the support arm with a spreader mounted on a three-point hitch of a tractor for spreading to the side of the tractor.

FIG. 2 is a top plan view showing the spreader on the support arm being pulled behind the tractor.

FIG. 3 is a rear elevational view of the side mounted spreader of FIG. 1.

FIG. 4 is a sectional view taken along line 4—4 in FIG. 1.

FIG. 5 is a side elevational view of the support arm with spreader being utilized as a pull type spreader.

FIG. 6 is a top plan view thereof.

FIG. 7 is a rear elevational view taken from the right end of FIG. 6.

DESCRIPTION OF THE PREFERRED EMBODIMENT

The side mounted spreader of this invention is referred to generally in FIG. 1 by the reference numeral 10 and is shown to include a support arm 12 with a spreader assembly 14 mounted on the outer end thereof. The support arm 12 includes an inner section 16 connected at its outer end to a vertical section 18 in turn connected to an outer section 20 which supports at its outer end the spreader assembly 14.

The three-point hitch lift arms 22 on a tractor 24 are connected to brackets 26 on the inner support arm section 16. An upstanding post 28 on the intersection 16 includes a bracket 30 connected to the three-point hitch stabilizer arm 32.

A platform 34 is provided at the upper end of the vertical section 18 and is utilized by the operator to fill a hopper 36 of the spreader 14.

It is thus seen in operation that a terrace area 38 as seen in FIG. 3 having a sloped surface 40 may be reached by the spreader 14 by selectively positioning the spreader between the raised and lowered positions represented by the solid and dashed lines through operation of the three-point hitch of the tractor. The spreading arc 42 is shown in FIGS. 1 and 2 representing the area covered by the spreader. An electric motor-driven spreader is available from Work Saver Manufacturing, Liechfield, Ill.

The support arm 12 may be utilized to convert the spreader into a pull-type spreader 10A as seen in FIGS. 2 and 5. A hitch 44 provided on the inner end of the inner section 16 is connected to a draw bar 46 on the tractor 24. A wheeled cart 48 supports the outer end of the support arm 12 through frame members 50 and 52 which extend upwardly in the case of frame member 50 and engages the outer end of the outer section 20 while the frame member 52 extends rearwardly and engages connecting bracket means 54 at the base of the vertical section 18. A wheel and axle assembly 56 are connected to the frame members 50 and 52. The fold down support 60 will support the inner end of the support arm 12 when disconnected from the tractor draw bar 46.

It is thus seen that the support arm 12 is convertible between a cantilevered arm for positioning the spreader 14 to the side of a tractor as seen in FIGS. 1 and 3 to a tongue for a pull-type spreader as seen in FIGS. 2 and 5.

I claim:

1. In combination, a tractor type vehicle and material spreader comprising:
   lift means on said tractor type vehicle;
   a support arm having one end connected to said lift means and the other end extending laterally of the path of travel of said tractor type vehicle;
   said material spreader being positioned on the outer other end of said support arm in spaced relation to the side of said vehicle whereby said support arm may be raised or lowered to selectively position said spreader relative to the ground; and
   said inner end of said support arm including a hitch means making said spreader adapted to be pulled behind said tractor with said support frame being supported on its outer end by a support wheeled cart.

2. The structure of claim 1 wherein said lift means is a three-point hitch on the rear of said tractor type vehicle.

3. The structure of claim 2 wherein said support arm includes inner and outer sections and said three-point hitch includes a pair of lift arms connected in spaced apart relationship to said inner section of said support arm.

4. The structure of claim I wherein said support arm includes inner and outer sections interconnected by a vertical section with the inner section connected to the lower end of said vertical section, and said outer section connected to the upper end of said vertical section to raise said spreader above a horizontal plane through the lift means and the lower arm section.

5. The structure of claim 4 wherein a platform is provided on said outer section of said support arm for standing while filling said spreader.

6. In combination, a tractor type vehicle and material spreader comprising:

lift means on said tractor type vehicle;

a support arm having one end connected to said lift means and the other end extending laterally of the path of travel of said tractor type vehicle;

said material spreader being positioned on the outer other end of said support arm in spaced relation to the side of said vehicle whereby said support arm may be raised or lowered to selectively position said spreader relative to the ground;

said support arm including inner and outer sections interconnected by a vertical section with the inner section connected to the lower end of said vertical section, and said outer section connected to the upper end of said vertical section to raise said spreader above a horizontal plane through the lift means and the lower arm section; and a support wheeled cart detachably attached to the outer end of said support arm.

7. The structure of claim 6 wherein said cart includes connecting means engaging said support arm between said vertical section and the outer end of said outer section.

8. The structure of claim 7 wherein said connecting means includes a frame member extending horizontally between the lower end of said vertical section of said support arm and a frame member extending upwardly into engagement with said outer section of said support arm.

* * * * *